US007483151B2

(12) United States Patent
Zganec et al.

(10) Patent No.: US 7,483,151 B2
(45) Date of Patent: Jan. 27, 2009

(54) ACTIVE 3D TRIANGULATION-BASED IMAGING METHOD AND DEVICE

(75) Inventors: Mario Zganec, Golnik (SI); Jerneja Zganec Gros, Golnik (SI)

(73) Assignee: Alpineon d.o.o., Ljubljana (SI)

( * ) Notice: Subject to any disclaimer, the term of this patent is extended or adjusted under 35 U.S.C. 154(b) by 547 days.

(21) Appl. No.: 11/377,657

(22) Filed: Mar. 17, 2006

(65) Prior Publication Data
US 2007/0216769 A1 Sep. 20, 2007

(51) Int. Cl.
*G01B 11/24* (2006.01)
(52) U.S. Cl. .................. 356/602; 702/159; 702/179
(58) Field of Classification Search .................. None
See application file for complete search history.

(56) References Cited

U.S. PATENT DOCUMENTS

| 4,643,578 | A | | 2/1987 | Stern | |
|---|---|---|---|---|---|
| 4,796,997 | A | * | 1/1989 | Svetkoff et al. | 356/608 |
| 5,024,529 | A | * | 6/1991 | Svetkoff et al. | 356/608 |
| 6,031,612 | A | * | 2/2000 | Shirley | 356/511 |
| 6,044,170 | A | * | 3/2000 | Migdal et al. | 356/613 |
| 6,507,036 | B1 | * | 1/2003 | Godin | 356/601 |
| 6,870,616 | B2 | * | 3/2005 | Jung et al. | 356/326 |
| 7,110,096 | B2 | * | 9/2006 | Jung et al. | 356/73 |

FOREIGN PATENT DOCUMENTS
EP    1 622 200 A1    2/2006

OTHER PUBLICATIONS

V. Upendranath, *Smart CMOS Image Sensor for 3D Measurement*, PhD Dissertation, Feb. 2005, DIE—University of Trento, Italy.

Tobias Möller et al., "Robust 3D Measurement with PMD Sensors", Proceedings of the 1st Range Imaging Research Day, ETH Zurich, Zurich, Switzerland, 2005.

* cited by examiner

Primary Examiner—L. G Lauchman
Assistant Examiner—Juan D Valentin
(74) Attorney, Agent, or Firm—Jacobson Holman PLLC

(57) ABSTRACT

Active 3D triangulation-based imaging comprises steps of: temporally modulating a radiant flux of a lighting unit beam by a binary modulation signal (ms); illuminating a scene (S), which is illuminated by an ambient lighting (AL), by said modulated lighting unit beam (mlub); splitting a ray (ir) imaging a scene point (SP) into two separate imaging rays (ir1, ir2); said first separate imaging ray (ir1) forming an image in a first image sensor (is1); temporally modulating a radiant flux of the second separate imaging ray (ir2) by the modulation signal (ms) and said modulated second separate imaging ray (ir2m) forming an image in a second image sensor (is2); normalizing a first scene image being an image of all points of the scene (S) formed in the first sensor (is1) and a second scene image formed in the second sensor (is2); and subtracting the first normalized scene image from the second normalized scene image.

Figure 1:
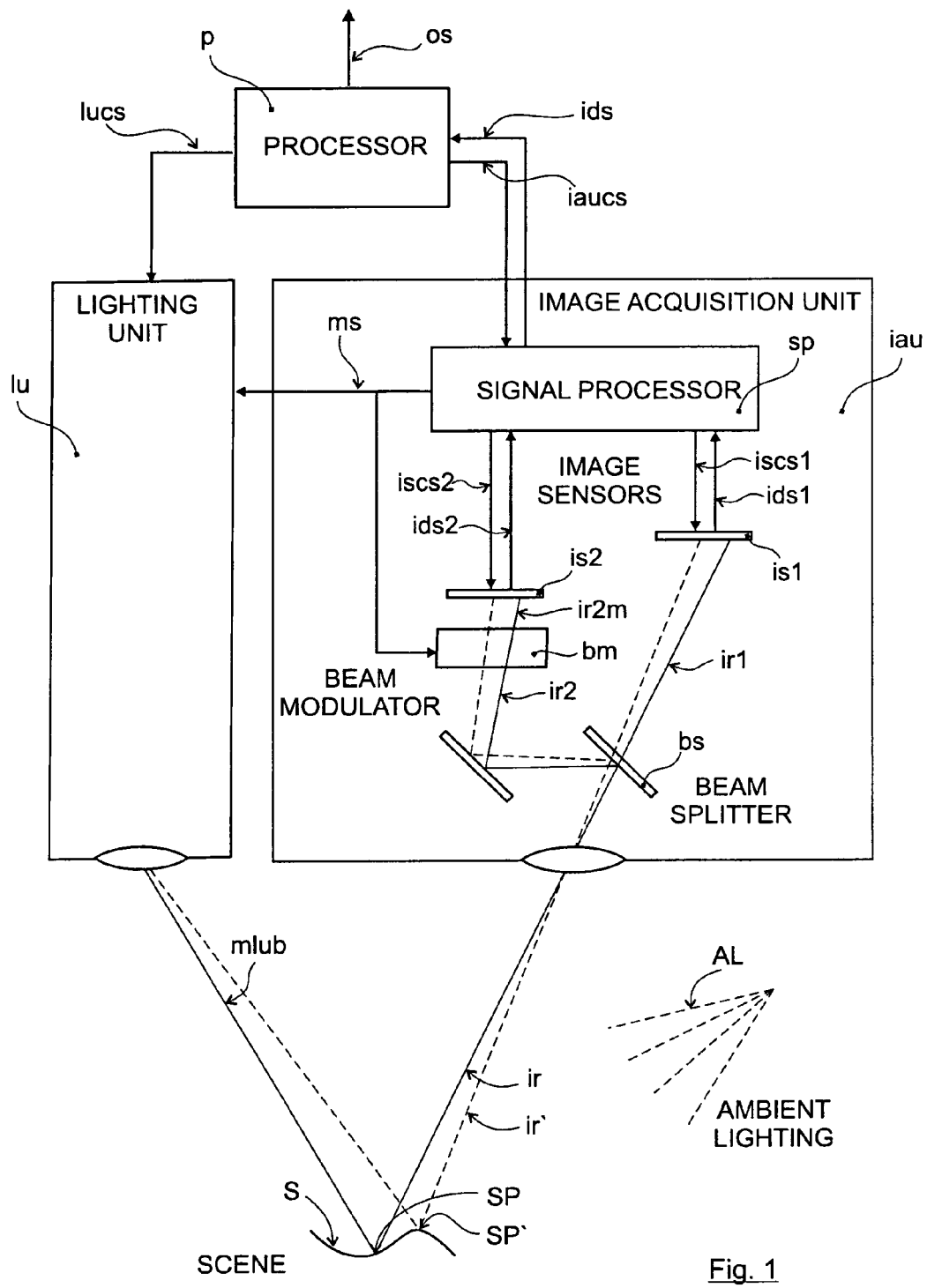

The proposed imaging using the random binary modulation signal distinguishes itself by a resistance to intentionally or unintentionally caused interferences. Hence the application is especially advantageous in machine vision appliances provided in an autonomous mobile robot or vehicle. The low radiant flux of the modulated lighting unit beam makes it possible to reduce the input power to a light source of the lighting unit hereby saving the energy and reducing lighting source costs.

12 Claims, 4 Drawing Sheets

ACTIVE 3D TRIANGULATION-BASED IMAGING METHOD AND DEVICE

The invention concerns an active three-dimensional (3D) real time imaging method based on triangulation for digitizing a three-dimensional shape of a scene by illuminating said scene by a low radiant flux even if the scene is illuminated by ambient lighting, and a device for performing said imaging method.

According to International Patent Classification the invention is classified to G 01B 11/30.

An active triangulation 3D imaging device illuminates a scene by means of its own lighting unit. The radiant flux of the lighting unit must be increased as the radiant flux of ambient lighting increases. However, the lighting unit emitting a high radiant flux cannot be tolerated in some applications, e.g. in imaging a human face. Further, known active three-dimensional imaging devices cannot be used in mobile robots and autonomous vehicles if their operation areas overlap, and in security devices which could be influenced by external lighting devices.

There has been known a technical solution in which an adverse affecting of a vision device by a welding arc glare and other ambient lighting is reduced by means of a mask provided with a narrow slit passing in front of the sensing surface in synchronism with the anticipated image position (U.S. Pat. No. 4,643,578). It is only applicable when a narrow lighting beam scanning a scene is used. Nevertheless, the entire sensing area cannot be masked effectively so that a severe adverse affecting still remains present.

There has also been known a time-of-flight 3D imaging (Möller, T., Kraft, H., Frey, J., Albrecht, M., Lange, R., Proceedings of the $1^{st}$ Range Imaging Research Day at ETH Zurich, Zurich, Switzerland (2005), "Robust 3D Measurement with PMD Sensors"). Transmitted light is modulated by a high-frequency signal. The scene image is synchronously demodulated and picked-up in four different intervals by a semiconductor sensor (Photonic Mixer Device), which allows a computation of the phase difference between the transmitted and the picked-up light as reflected by each scene point. Said phase difference is proportional to the distance to the scene point from which light was reflected. A background illumination contributes the same amount of light in each time interval of the measurement. Hence, said contribution does not affect the calculated distance. Yet, the distances to the scene points are calculated by using analogue values of light energy absorbed during the integrated periods. Said values, however, are affected by a nonlinearity and a temperature dependence of the sensor as well as by differences in the scene reflectance and the saturation appearance of sensor pixels.

An object of the present invention is to provide an active 3D triangulation-based imaging method and a device, wherein the influence of ambient lighting on the requirement concerning the radiant flux of a lighting unit being provided in said device is eliminated.

The said object is achieved by the subject matter of the claims.

The active 3D triangulation-based imaging according to the invention reveals several advantages over known imaging of this kind. The proposed imaging using the random binary modulation signal distinguishes itself by a resistance to intentionally or unintentionally caused interferences. Hence the application of the technical solution as proposed by the invention is especially advantageous in machine vision appliances used in an autonomous mobile robot or vehicle because of a complete elimination of the effects of an interfering lighting emitted by other autonomous mobile robots or vehicles operating in the same area if a random binary modulation signal is used.

The low radiant flux of the modulated lighting unit beam makes it possible to reduce the input power to the light source of the lighting unit, hereby saving the energy and reducing the lighting source costs. Due to the low radiant flux of the modulated lighting unit beam, the method and the device as proposed by the invention are acceptable to take 3D triangulation-based images of human faces by means of a laser lighting beam.

Figure 2:
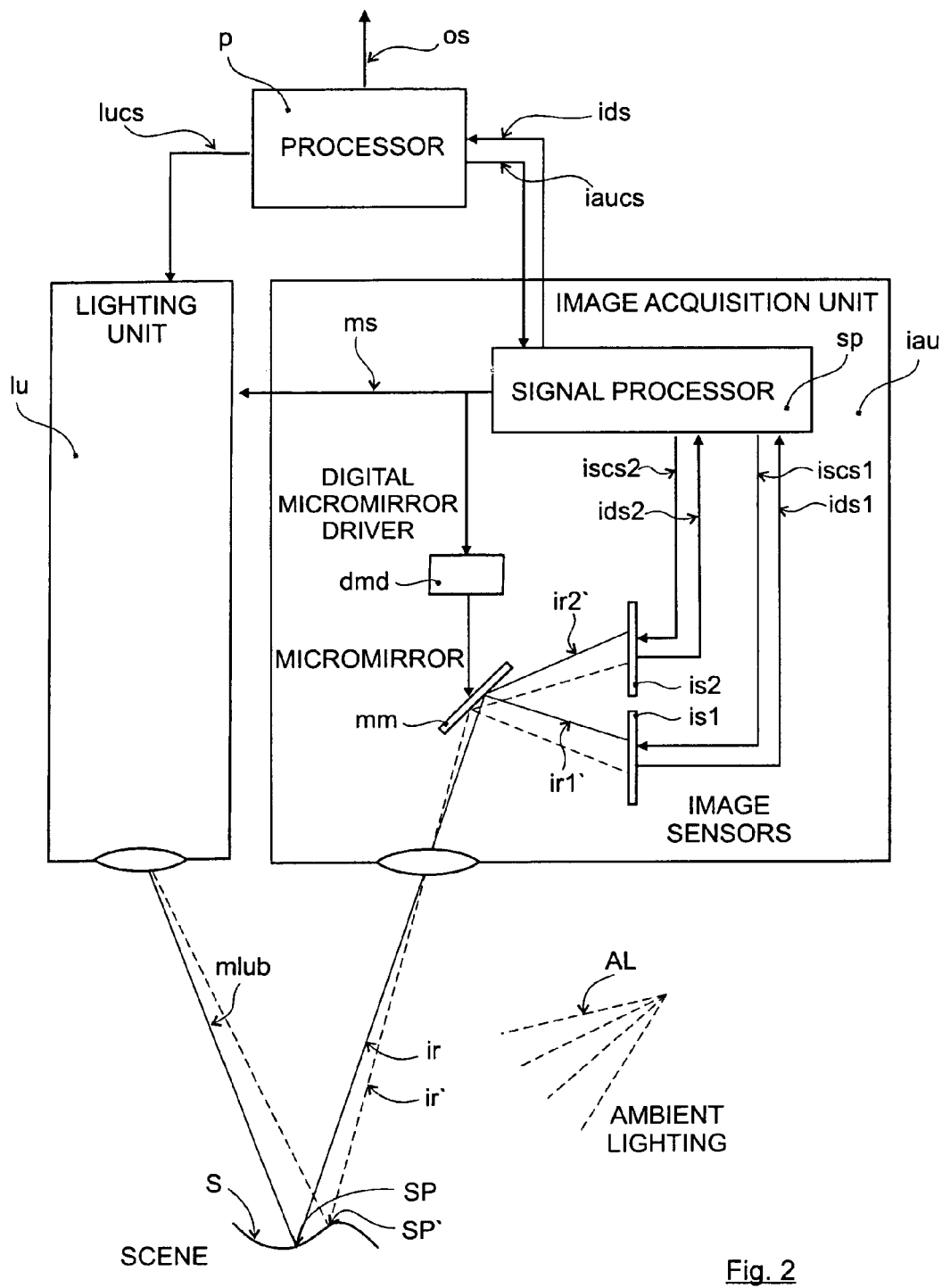
Figure 3:
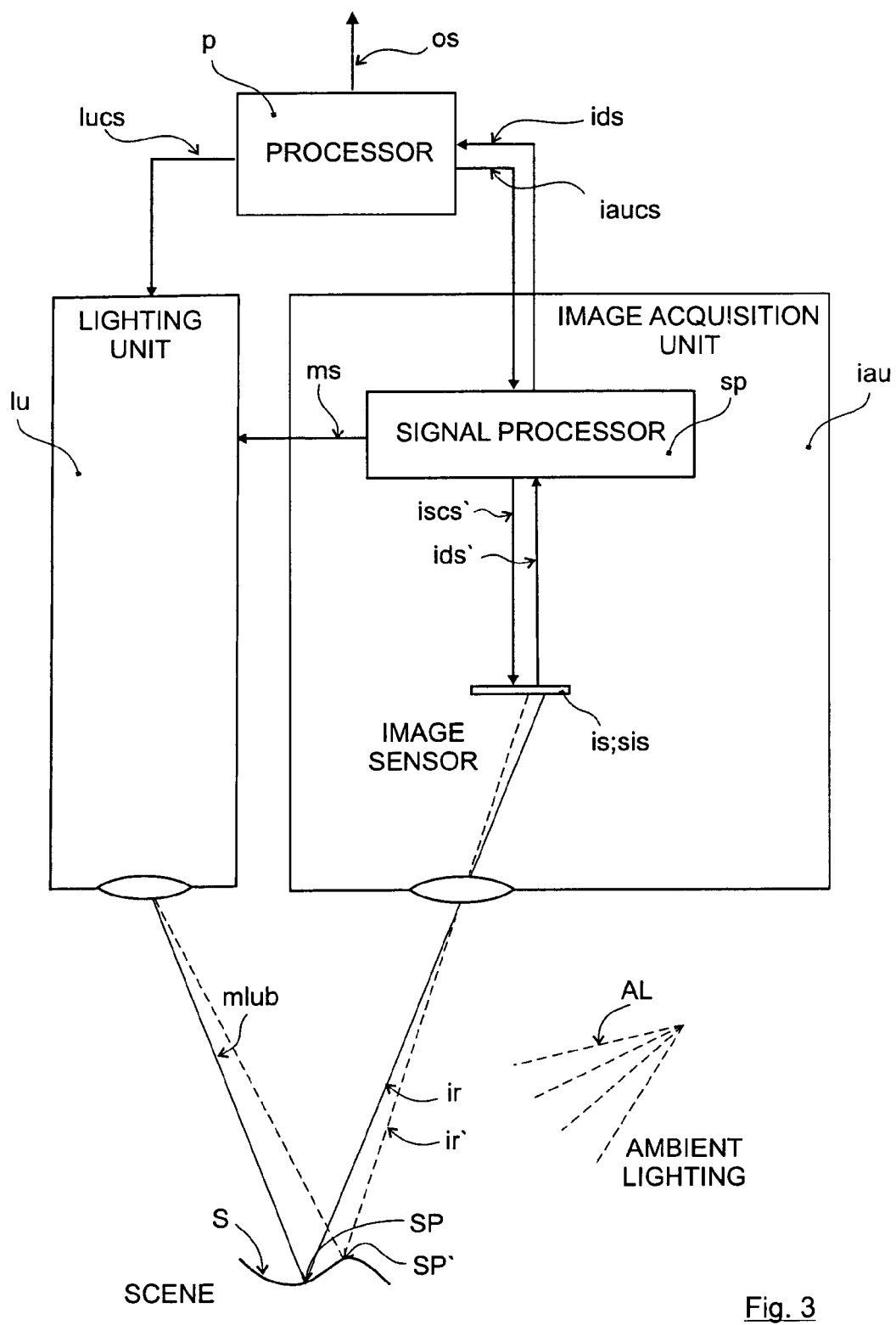
Figure 4:
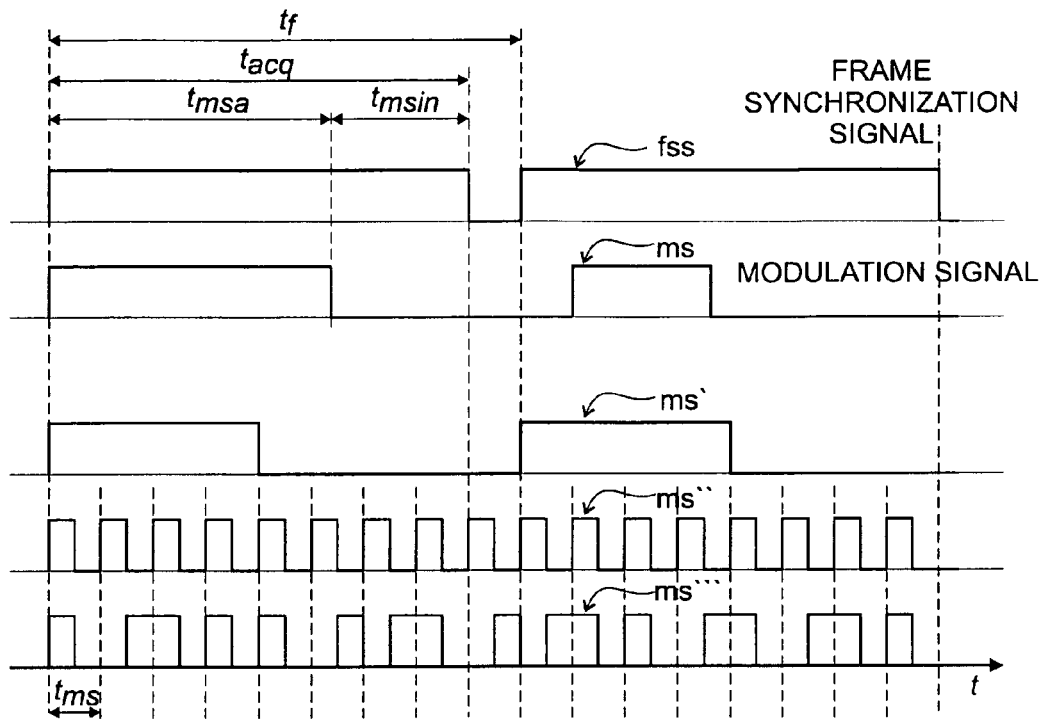
Figure 5:
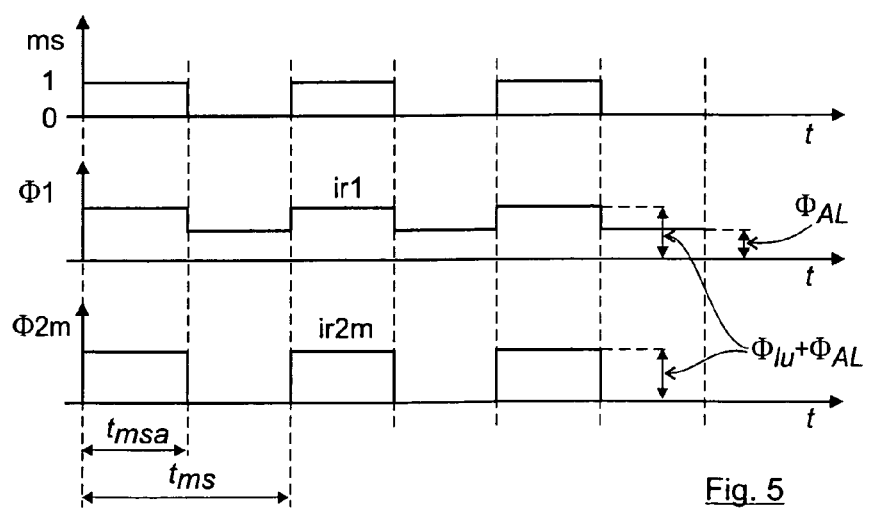

The invention will now be explained in more detail by way of the description of embodiments and with reference to the accompanying drawing representing in:

FIG. 1 a first variant of the active 3D triangulation-based imaging device embodiment of the invention providing the binary modulation of a radiant flux for one of two separate imaging rays;

FIG. 2 a second variant of the active 3D triangulation-based imaging device embodiment of the invention providing the formation of two separate imaging rays by deflecting the ray imaging a scene in the rhythm of a binary modulation signal;

FIG. 3 a third variant of the active 3D triangulation-based imaging device embodiment of the invention providing the formation of a first and a second image of the scene point in a single image sensor during an inactive and an active signal state of the modulation signal;

FIG. 4 a schematic presentation of a frame synchronization signal and of several variants of the binary modulation signal;

FIG. 5 a schematic presentation of the binary modulation signal and radiant fluxes of both separate imaging rays for the first variant of the active 3D triangulation-based imaging device embodiment of the invention.

A first variant of the active 3D triangulation-based imaging device according to the invention is schematically represented in FIG. 1. A processor p issues a lighting unit control signal lucs controlling a lighting unit lu, an image acquisition unit control signal iaucs controlling an image acquisition unit iau as well as an output signal os representing a final image of a scene S. From the image acquisition unit iau the processor p, however, receives an image data signal ids. In the image acquisition unit iau there is actually a signal processor sp receiving the signal iaucs and issuing the signal ids. The signal processor sp controls image sensors is1 and is2 by control signals iscs1 and iscs2, respectively, and receives herefrom image data signals ids1 and ids2, respectively, being analog or digital video signals.

A lighting unit lu is provided with a light source, e.g. a laser, a light emitting diode or of any other kind, and emits a temporally modulated lighting unit beam mlub. According to the invention, the lighting unit beam mlub has been temporally modulated by a binary modulation signal ms (FIGS. 4 and 5) so that its radiant flux attains just two values, the original value and zero. Said modulation is achieved either by modulating the light source input power or by blocking or deviating the path of a light beam emitted by the light source by means known to persons skilled in the art like an acousto-optical, electro-optical, piezzo-electrical, photo-elastic, mechanical (chopper, shutter, rotating prism or mirror) device or a digital micromirror device.

The modulated lighting unit beam mlub illuminates a scene S, an image—a frame—of which has to be taken. Said scene S is also illuminated by an ambient lighting AL. A ray ir imaging a point SP of the scene S in a pixel of a first image sensor is1 and in a pixel of a second image sensor is2 is a result of the illumination from said scene point SP. Said image sensors is1, is2 are CCD sensors or CMOS sensors. A ray ir' images another scene point SP' and similar rays image other scene points in the same way.

According to the invention, the imaging ray ir being a part of a beam of imaging rays ir, ir' . . . is split by a beam splitter bs, provided in the image acquisition unit iau, into two separate imaging rays ir1 and ir2. The first image sensor is1 forms an image of the scene point SP by means of the first separate imaging ray ir1 entering said image sensor is1. The second separate imaging ray ir2, however, traverses a beam modulator bm, which may be an acousto-optical, electro-optical, piezzo-electrical, photo-elastic, mechanical (chopper, shutter, rotating prism or mirror) device or a digital micromirror device. According to the invention the beam modulator bm is controlled by the binary modulating signal ms modulating also the lighting unit lu. The binary modulating signal ms is produced in the signal processor sp. The beam modulator bm temporally modulates a radiant flux of the second separate imaging ray ir2 to produce a modulated second separate imaging ray ir2m and the second image sensor is2 forms an image of the scene point SP by means of the modulated second separate imaging ray ir2m.

The signal processor sp normalizes a first scene image being an image of all points of the scene S formed in the first image sensor is1 as well as a second scene image being an image of all points of the scene S formed in the second image sensor is2. The image normalization is performed in that all pixel values are divided by a percentage of a frame period $t_f$ pertaining to the time duration in which the image sensor accumulated the beam imaging the scene. The two separate imaging beams must have the same solid angle distribution of the radiant flux. Further, the processor p subtracts the first normalized scene image—actually multiplied by a duty cycle of the modulation signal—from the second normalized scene image to obtain the final image of the scene S.

A general binary modulation signal ms has at least a part of an active and an inactive signal state within each active signal state of a frame synchronization signal fss (FIG. 4). Within the active state of the frame synchronization signal fss (its period being $t_f$—frame period) called an acquisition period $t_{acq}$ the active states of the binary modulation signal ms, ms' have a cumulative duration $t_{msa}$ and the inactive states of the binary modulation signal ms have a cumulative duration $t_{msin}$. Said cumulative durations $t_{msa}$ and $t_{msin}$ need not be equal, however, they may be approximately equal at a periodic binary modulation signal ms''. The inactive state of the frame synchronization signal fss is usually used to transfer the acquired scene images from image sensors is1, is2 to the signal processor sp. Advantageously, the binary modulation signal is a Manchester encoded sequence ms''' of random binary digits and most advantageously it is a high-frequency signal having a period $t_{ms}$. The random binary modulation signal ms is preferred to the periodic one. The use of the random binary modulation signal ms makes the technical solution of the invention more resistant to intentionally or unintentionally caused interferences like stroboscopic lighting or a laser pointer beam, since the time correlation of the modulated lighting unit beam ms with said interfering lightings is negligible. If the scene S changes fast, the bit frequency of the binary modulation signal ms should be as high as allowed by the device modulating the lighting unit beam and the device modulating the radiant flux of the second separate imaging ray ir2.

The following calculation is made to illustrate that the ambient lighting AL, being quasistatic with respect to the time variation of the binary modulation signal ms, does not influence the energy accumulated by the pixel of the final scene image. The radiant fluxes leaving the beam splitter bs have the same value and are a sum of the radiant flux $\Phi_{lu}$ due to the illumination by the lighting unit lu and of the radiant flux $\Phi_{AL}$ due to the illumination by the ambient lighting AL. Taking into account the designations in FIG. 4 and FIG. 5, the energy $E_1$ accumulated by a pixel of the first image sensor is1 and the energy $E_2$ accumulated by a pixel of the second image sensor is2 during the period $t_{ms}$ of the binary modulation signal ms are $E_1 = t_{msa}\Phi_{lu} + t_{ms}\Phi_{AL}$ and $E_2 = t_{msa}(\Phi_{lu} + \Phi_{AL})$. By multiplying said energy $E_1$ by a duty cycle $$\frac{t_{msa}}{t_{ms}}$$

of the modulation signal ms and subtracting the product from said energy $E_2$, the result $$\left(\left(\frac{t_{msa}}{t_{ms}}\right) - \left(\frac{t_{msa}}{t_{ms}}\right)^2\right) t_{ms}\Phi_{lu}$$

does not depend on the illumination of the scene S by the ambient lighting AL.

A first variant of the active 3D triangulation-based imaging method according to the invention which may be performed by said device, comprises the following steps. A radiant flux of a lighting unit beam is temporally modulated by the binary modulation signal ms. The scene S, which is illuminated by the ambient lighting AL, is illuminated by the modulated lighting unit beam mlub. The ray ir imaging the point SP of the scene S is split into two separate imaging rays ir1, ir2. The first separate imaging ray ir1 forms the image of the scene point SP in the first image sensor is1. The radiant flux of the second separate imaging ray ir2, however, is temporally modulated by the binary modulation signal ms and said modulated second separate imaging ray ir2m forms the image of the scene point SP in the second image sensor is2. Thereafter the first scene image being an image of all points of the scene S formed in the first sensor is1 and the second scene image being the image of all points of the scene S formed in the second sensor is2 are normalized. This step is not necessary if the binary modulation signal ms has a duty cycle close to 50%. The final scene image is obtained by subtracting the first normalized scene image from the second normalized scene image. It reproduces the scene S as illuminated only by the modulated lighting unit beam mlub.

The final 3D triangulation-based scene image is used in the same way as a scene image acquired by means of a known method and device, for example to calculate distances to specific scene points in machine vision appliances. Such appliances provided with the proposed technical solution are appropriate for autonomous mobile robots or autonomous vehicles. This application when using a random binary modulation signal is especially advantageous because of a complete elimination of the effects of ambient lighting, which might even be interfering if originating from other autonomous mobile robots or autonomous vehicles operating in the same area and emitting a modulated lighting beam accidentaly correlated to the modulated lighting beam of said robot or vehicle. A complete elimination of the ambient lighting in the final scene image makes it possible to take a 3D triangulation-based image by means of the modulated lighting unit beam mlub having a low radiant flux. Therefore, the method and device as proposed by the invention are acceptable to take a 3D triangulation-based images of light sensitive objects by means of a laser lighting beam.

A second variant of the active 3D triangulation-based imaging device embodiment according to the invention is schematically represented in FIG. 2. Here an image acquisition unit iau' is provided with a micromirror mm, which is driven by a digital micromirror driver dmd controlled by the binary modulation signal ms and forms two separate imaging rays ir1', ir2' by deflecting the ray ir imaging the scene point SP. A first image sensor is1 forms an image of the scene point SP by means of the first separate imaging ray ir1' and a second image sensor is2 forms an image of the scene point SP by means of the second separate imaging ray ir2'. The signal processor sp normalizes a first scene image being an image of all points of the scene S formed in the first image sensor is1 and a second scene image being an image of all points of the scene S formed in the second image sensor is2. Finally, the first normalized scene image is subtracted from the second normalized scene image to obtain a final scene image.

A second variant of the active 3D triangulation-based imaging method according to the invention which may be performed by said device comprises the following steps. Here two separate imaging rays ir1', ir2' are formed by deflecting the ray ir imaging a point SP of the scene S in a rhythm of the binary modulation signal ms. The first separate imaging ray ir1' during an active signal state of the modulation signal ms forms a first image of the scene point SP in the first image sensor is1 and the second separate imaging ray ir2' during an inactive signal state of the modulation signal ms forms a second image of the scene point SP in the second image sensor is2. Two scene images are normalized and subtracted from each other.

A third variant of the active 3D triangulation-based imaging device embodiment according to the invention is schematically represented in FIG. 3. Here an image acquisition unit iau" is provided with only one image sensor is; sis. The image sensor sis is a smart image sensor (EP 1 622 200 A1; V. Upendranath, Smart CMOS Image Sensor for 3D Measurement, PhD Dissertation, February 2005, DIT—University of Trento, Italy). It forms an image of the scene point SP by means of a ray ir imaging the scene point SP. A first scene image is accumulated as an image of all scene points formed in the image sensor is; sis during inactive signal states of the binary modulation signal ms and a second scene image is accumulated as an image of all scene points formed in the image sensor is; sis during active signal states of the binary modulation signal ms. The two scene images are normalized and subtracted from each other to obtain a final scene image. Said scene image accumulation may be performed either by the signal processor sp or within pixels of the smart sensor sis.

Accordingly, a third variant of the active 3D triangulation-based imaging method according to the invention which may be performed by said device comprises the steps analogous to those of previous two variants, the difference being in that a ray ir imaging a scene point SP forms a first image of the scene point SP during an inactive signal state of the modulation signal ms and forms a second image of the scene point SP during an active signal state of the modulation signal ms and that both said images are formed in the same image sensor.

The invention claimed is:

1. Active 3D triangulation-based imaging method comprising steps of:
    temporally modulating a radiant flux of a lighting unit beam by a binary modulation signal (ms);
    illuminating a scene (S), which is illuminated by an ambient lighting (AL), by said modulated lighting unit beam (mlub);
    splitting a ray (ir) imaging a point (SP) of the scene (S) into two separate imaging rays (ir1, ir2);
    said first separate imaging ray (ir1) forming an image of the scene point (SP) in a first image sensor (is1);
    temporally modulating a radiant flux of the second separate imaging ray (ir2) by the binary modulation signal (ms) and
    said modulated second separate imaging ray (ir2m) forming an image of the scene point (SP) in a second image sensor (is2);
    normalizing a first scene image being an image of all points of the scene (S) formed in the first sensor (is1) and
    a second scene image being an image of all points of the scene (S) formed in the second sensor (is2); and
    subtracting the first normalized scene image from the second normalized scene image.

2. The method of claim 1, wherein the binary modulation signal (ms) has active as well as inactive signal states in each active signal state of a frame synchronization signal (fss).

3. The method of claim 2, wherein the cumulative duration of all active signal states and the cumulative duration of all inactive signal states of the modulation signal (ms) in each active signal state of a frame synchronization signal (fss) are approximately equal.

4. The method of claim 3, wherein the binary modulation signal (ms) is a random binary signal.

5. The method of claim 4, wherein the binary modulation signal (ms) is a Manchester encoded sequence of random binary digits.

6. The method of claim 5, wherein the binary modulation signal (ms) is a high-frequency signal.

7. Active 3D triangulation-based imaging method comprising steps of:
    temporally modulating a radiant flux of a lighting unit beam by a binary modulation signal (ms);
    illuminating a scene (S), which is illuminated by an ambient lighting (AL), by said modulated lighting unit beam (mlub);
    forming two separate imaging rays (ir1', ir2') by deflecting a ray (ir) imaging a point (SP) of the scene (S) in the rhythm of the binary modulation signal (ms);
    said first separate imaging ray (ir1') during an active signal state of the modulation signal (ms) forming a first image of the scene point (SP) in a first image sensor (is1);
    said second separate imaging ray (ir2') during an inactive signal state of the modulation signal (ms) forming a second image of the scene point (SP) in a second image sensor (is2);
    normalizing a first image being an image of all points of the scene (S) formed in the first sensor (is1) and a second image being an image of all points of the scene (S) formed in the second sensor (is2); and
    subtracting the first normalized scene image from the second normalized scene image.

8. Active 3D triangulation-based imaging method comprising steps of:
    temporally modulating a radiant flux of a lighting unit beam by a binary modulation signal (ms);
    illuminating a scene (S), which is illuminated by an ambient lighting (AL), by said modulated lighting unit beam (mlub);
    a ray (ir) imaging a point (SP) of the scene (S)
        during an inactive signal state of the modulation signal (ms) forming a first image of the scene point (SP) and
        during an active signal state of the modulation signal (ms) forming a second image of the scene point (SP), both said images being formed in the same image sensor (is; sis);

normalizing
- a first scene image being an image of all points of the scene (S) formed in the image sensor (is; sis) during an inactive signal state of the modulation signal (ms) and
- a second scene image being an image of all points of the scene (S) formed in the same image sensor (is; isi) during an active signal state of the modulation signal (ms); and subtracting the first normalized scene image from the second normalized scene image.

9. Active 3D triangulation-based imaging device comprising:
- a lighting unit (lu) emitting a modulated lighting unit beam (mlub), which has been temporally modulated by a binary modulation signal (ms) and which together with an ambient lighting (AL) illuminates a scene (S);
- a beam splitter (bs) splitting a ray (ir) imaging a point (SP) of the scene (S) into two separate imaging rays (ir1, ir2);
- a beam modulator (bm) being controlled by the binary modulation signal (ms) to temporally modulate a radiant flux of the second separate imaging ray (ir2) to produce a modulated second separate imaging ray (ir2m);
- a first image sensor (is1) forming an image of the scene point (SP) by means of the first separate imaging ray (ir1);
- a second image sensor (is2) forming an image of the scene point (SP) by means of the modulated second separate imaging ray (ir2m);
- a processing means (p, sp) for
  generating
    - a signal (lucs) for controlling the lighting unit (lu),
    - signals (iscs1, iscs2) for controlling the first image sensor (is1) and the second image sensor (is2), respectively,
    - the binary modulation signal (ms) controlling the lighting unit (lu) and the beam modulator (bm), and
  normalizing
    - a first scene image being an image of all points of the scene (S) formed in the first image sensor (is1) and
    - a second scene image being an image of all points of the scene (S) formed in the second image sensor (is2), and
  subtracting the first normalized scene image from the second normalized scene image to obtain a final scene image.

10. Active 3D triangulation-based imaging device comprising:
- a lighting unit (lu) emitting a modulated lighting unit beam (mlub), which has been temporally modulated by a binary modulation signal (ms) and which together with an ambient lighting (AL) illuminates a scene (S);
- a micromirror (mm) which is driven by a digital micromirror driver (dmd) controlled by the binary modulation signal (ms) and forms two separate imaging rays (ir1', ir2') by deflecting a ray (ir) imaging a point (SP) of the scene (S);
- a first image sensor (is1) forming an image of the scene point (SP) by means of the first separate imaging ray (ir1');
- a second image sensor (is2) forming an image of the scene point (SP) by means of the second separate imaging ray (ir2');
- a processing means (p, sp) for
  generating
    - a signal (lucs) for controlling the lighting unit (lu),
    - signals (iscs1, iscs2) for controlling the first image sensor (is1) and the second image sensor (is2), respectively,
    - the binary modulation signal (ms) controlling the lighting unit (lu) and the digital micromirror driver (dmd),
  normalizing
    - a first scene image being an image of all points of the scene (S) formed in the first image sensor (is1), and
    - a second scene image being an image of all points of the scene (S) formed in the second image sensor (is2), and
  subtracting
    the first normalized scene image from the second normalized scene image to obtain a final scene image.

11. Active 3D triangulation-based imaging device comprising:
- a lighting unit (lu) emitting a modulated lighting unit beam (mlub), which has been temporally modulated by a binary modulation signal (ms) and which together with an ambient lighting (AL) illuminates a scene (S);
- an image sensor (is) forming an image of the scene point (SP) by means of a ray (ir) imaging a point (SP) of the scene (S);
- a processing means (p, sp) for
  generating
    - a signal (lucs) for controlling the lighting unit (lu),
    - a signal (iscs') for controlling the image sensor (is),
    - the binary modulation signal (ms) controlling the lighting unit (lu),
  accumulating
    - a first scene image being an image of all points of the scene (S) formed in the image sensor (is) during inactive signal states of the binary modulation signal (ms) and
    - a second scene image being an image of all points of the scene (S) formed in the image sensor (is) during active signal states of the binary modulation signal (ms),
  normalizing the first scene image and the second scene image, and
  subtracting the first normalized scene image from the second normalized scene image to obtain a final scene image.

12. The device of claim 11, wherein the image sensor is a smart image sensor (sis) accumulating the first scene image and the second scene image.

* * * * *